United States Patent [19]

Jonason

[11] 4,437,216

[45] Mar. 20, 1984

[54] METHOD OF MANUFACTURING A HEAT EXCHANGER FOR COOLING AND HEATING PURPOSES

[75] Inventor: Karl G. Jonason, Västerås, Sweden

[73] Assignee: Granges Metallverken Aktiebolag, Västerås, Sweden

[21] Appl. No.: 190,886

[22] PCT Filed: Jul. 11, 1979

[86] PCT No.: PCT/SE79/00153

§ 371 Date: Mar. 12, 1980

§ 102(e) Date: Mar. 12, 1980

[87] PCT Pub. No.: WO80/00228

PCT Pub. Date: Feb. 21, 1980

[30] Foreign Application Priority Data

Jul. 13, 1978 [SE] Sweden ................................ 7807818

[51] Int. Cl.³ .............................................. B23P 15/26
[52] U.S. Cl. ................................ 29/157.3 A; 228/183;
414/745; 29/726; 29/157.3 C
[58] Field of Search .......... 228/183; 29/727, 157.3 R,
29/157.3 A, 157.3 B, 157.3 C; 414/745

[56] References Cited

U.S. PATENT DOCUMENTS

| | | | |
|---|---|---|---|
| 3,310,868 | 3/1967 | La Porte et al. | 29/157.3 |
| 4,291,450 | 9/1981 | Rhodes | 228/183 |
| 4,380,106 | 4/1983 | Jonason | 29/157.3 A |
| 4,380,854 | 4/1983 | Jonason | 29/157.3 A |

FOREIGN PATENT DOCUMENTS

| | | | |
|---|---|---|---|
| 28400 | 5/1981 | European Pat. Off. | 29/726 |
| 215007 | 9/1967 | Sweden. | |
| 1449296 | 9/1976 | United Kingdom. | |
| 1525761 | 9/1978 | United Kingdom. | |

Primary Examiner—Howard N. Goldberg
Assistant Examiner—V. K. Rising
Attorney, Agent, or Firm—Fleit, Jacobson, Cohn & Price

[57] ABSTRACT

A method and apparatus for manufacturing heat exchangers for cooling and heating purposes from substantially rectangular tube elements alternating with surface-enlarging members in the form of thin pleated metal strips being advanced, pressed against each other, through a heating zone for soldering together and thereafter discharged through a cooling zone for cooling the solder to fusion temperature, the advancing movement being opposed by a constant retarding force means acting in a direction counter to the direction of advance.

7 Claims, 4 Drawing Figures

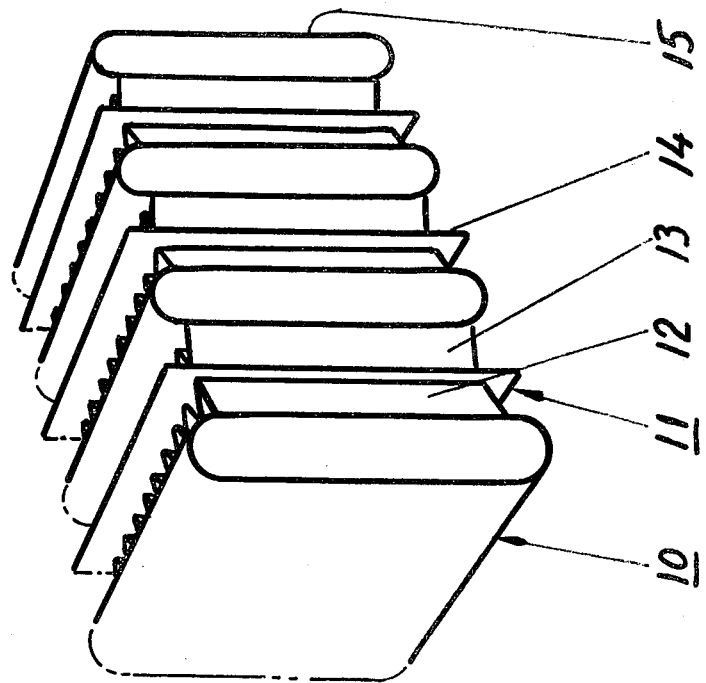
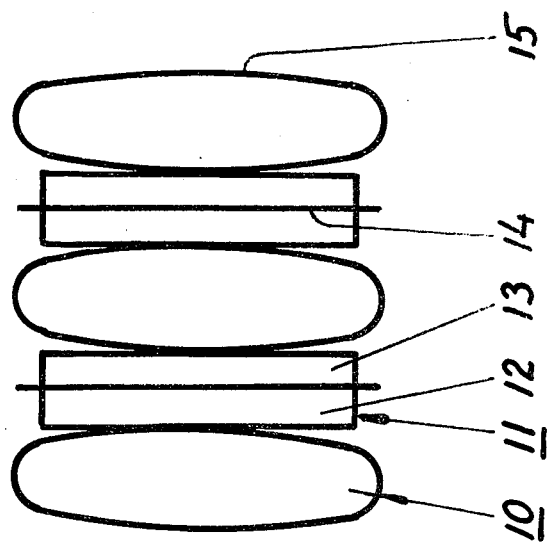

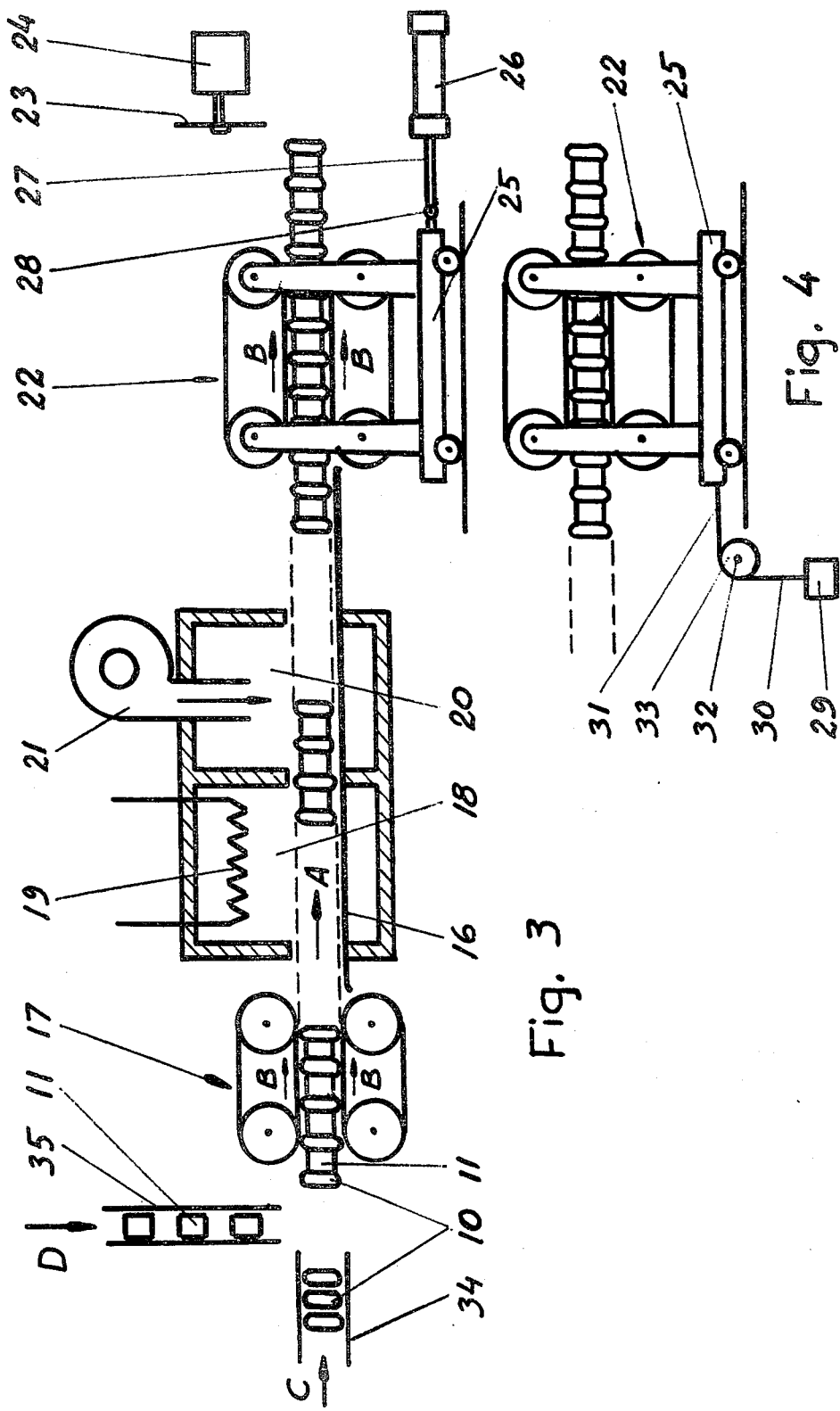

METHOD OF MANUFACTURING A HEAT EXCHANGER FOR COOLING AND HEATING PURPOSES

The present invention relates to a method in manufacturing heat exchangers for cooling and heating purposes, said heat exchangers comprising a predetermined number of tubes with substantially rectangular cross section alternating with intermediate surface-enlarging members in the form of pleated, thin metal strips, united at their peaks by means of solder to the wider sides of the tubes and maintaining a uniform pitch between the tubes, starting from tube element pieces and surface-enlarging members of predetermined lengths.

The invention also relates to an apparatus for carrying out the method of manufacturing heat exchangers for cooling and heating purposes in accordance with the invention.

In the manufacture of heat exchangers for car radiators, for example, it is known in the art to manually alternately arrange tubes with a flat configuration and surface enlarging members in the form of pleated, thin metal strips in frames or the like, where either the tubes or the surface-enlarging members have been provided with solder. Subsequent to all the details required in such a heat exchanger being inserted in the frame, the stack of details situated therein is compressed with the aid of a bridging member or the like so that suitable abutment is obtained between the details incorporated.

After these steps have been taken, the stack of details enclosed in this way is subjected to heating so that the solder melts, whereafter the stack is cooled so that the peaks of the thin metal strips are soldered to the tubes and an intimate heat-conducting metallic union is established.

With the intention of obtaining optimum utilization of the material in manufacturing heat exchangers of the kind in question here, with respect to heat conducting ability and with regard to the desire of reducing the weight of the heat exchanger to the lowest value, it has been previously proposed, inter alia, to use copper strips for the production of the surface enlarging members, said strips having been rolled down to very small thicknesses.

However, in the manual handling of such surface-enlarging members built up from ever thinner copper strip, it has been found that these thin means are extremely easily deformed, which in turn has the consequence that there occur incomplete solder joints between the surface-enlarging members and the tube elements.

To remove this drawback, the surface-enlarging members have been produced in the form of pleated copper strips, soldered together with an intermediate flat metal strip to give the means greater stiffness and less fragility in handling.

These steps have not been found sufficient to master the said problem either, at least with regard to the manual handling.

On the basis of this experience it has been sought to eliminate manual handling and automate production of the heat exchangers in question, to avoid the risks of damage caused manually. The object of the invention is consequently to provide a method as above, which is substantially characterized in that the tube element pieces and surface-enlarging members are continuously placed in abutment with each other, and in this position are forcibly fed in their transverse direction while overcoming a predetermined restraining force, first through a heating zone for melting the solder to soldering temperature and thereafter through a cooling zone for cooling the melted solder to fusion temperature so that the peaks on the pleated metal strip are brought into intimate soldered union with adjacent tube member pieces.

The apparatus in accordance with the invention for carrying out the method of manufacturing heat exchangers for cooling and heating purposes is mainly characterized in that the apparatus has an advancing track provided with a charging and a discharging end for continuous forced advance in its transverse direction of the tube element pieces and surface-enlarging members alternately abutting in intimate mutual contact, a force feeder being coordinated with the feed track for carrying out said forced advance of the tube element pieces and surface-enlarging members, from said charging end towards said discharging of the feed track, in that there is a retarding or restraining means for continuously counteracting the forced advance movement on the discharge side with a constant predetermined counteracting force, and in that the feed track, starting from the charging end, first extends through a heating zone for melting the solder to soldering temperature, then through a cooling zone for cooling the melted solder to a fusion temperature, the peaks of the pleated metal strip thus being brought into intimate heat conducting metallic union with the adjacent tube element pieces.

The invention will now be described in detail while referring to an embodiment example thereof schematically shown on the accompanying drawing, and in conjunction therewith further characterizing features of the invention will be disclosed.

On the drawing, FIG. 1 is an end view of loosely assembled tube elements and surface-enlarging members in the form of pleated thin metal strip, the latter consisting in the shown embodiment of two pleated metal strips and an intermediate flat metal strip, FIG. 2 is a perspective partial view of the details in FIG. 1 when soldered together, FIG. 3 is a vertical projection, partly in section, of an apparatus in accordance with the invention for carrying out the method, combined with a charging apparatus for the tube element pieces and surface-enlarging members, and with a driven sawing means for sawing off previously determined groups of soldered tube element pieces and surface-enlarging members, and finally FIG. 4 illustrates an alternative embodiment of the apparatus illustrated in FIG. 3, for individually displacing a driving means for discharging a finished heat exchanger construction after soldering.

Turning now to the FIGS. 1 and 2, a plurality of thin-walled metal tubes are denoted by the numeral 10, preferably brass tubes of a flat configuration with a curved contour at the ends. Intermediate surface-enlarging members are denoted by the numeral 11, and comprise two pleated thin metal strips 12 and 13 separated by a thin flat metal strip 14.

The tube elements 10 are formed with somewhat convex abutment sides 15, intended for being flattened yieldingly under the action of an executed compression, the peaks of the pleated metal strips being pressed into intimate contact with the whole of the abutment sides 15 of the respective tube element while carrying out a soldering procedure. A uniform soldered joint is thus obtained between the details, so that uniform heat transmission can take place between them during practical use of the heat exchanger, without risk of breaking the soldered joints.

For carrying out the soldering, the tube element pieces 10 can be used, for example, these being covered on the outside with a layer of solder, or solder can be used which has been applied solely to the peaks of the surface increasing means. The tube element pieces and surface-enlarging members joined together in this way are thus intended to form a unit where it is especially important that an accurate pitch or uniform spacing is maintained between the centres of the tube elements, since during the construction of the heat exchangers the easy joining of the end portions of the tube elements to other details must be enabled, the latter being provided with holes for receiving the end portions of the tube elements. The compression during the soldering operation must be very closely controlled so that good abutment is obtained between the details, but also so that no remaining deformation occurs either between the tube element pieces or the surface-enlarging members. Consideration must be paid in this respect to the alterations in dimensions occurring during the soldering operation as a result of the increased temperature.

In FIG. 3, which constitutes a schematic partially sectioned vertical projection of an apparatus for carrying out the method in accordance with the invention, a schematically illustrated horizontal feed track is denoted by the numeral 16, on which the tube element pieces 10 and the surface-enlarging members 11 are advanced. To advance these details in the direction of the arrow A, there is arranged a belt conveyor 17 comprising two endless belts driven in the direction of the arrows B, in driving engagement against the elements 10 and members 11 for advancing the details intimately abutting each other through a heating zone 18, containing a heating element 19, and also advancing them through a cooling zone 20 provided with a fan 21 or other suitable cooling means. During this passage through the heating zone 18 and cooling zone 20 the solder is first heated to soldering temperature, whereafter the elements 10 and the members 11 are cooled to provide formation of a soldered joint simultaneously as they are kept intimately pressed against each other. The soldered details are then discharged continuously to the right in FIG. 3, with the help of a discharge apparatus generally denoted by the numeral 22 comprising endless belts, which are driven in the direction of the arrows B and advance the soldered details to the right in the Figure. As a final operation, groups of a predetermined number of tube element pieces and surface-enlarging members are cut off with the help of a rotating circular saw 23 driven by a motor 24.

According to the inventive concept, it is important that an active force is maintained counter to the forced advance of the driving means 17, at the discharge end drive means 22 to restrain the advance through the cooling zone 20 etc. It is important that a counteracting force is maintained which is not affected either by the driving movement from the driving means 17 or from the material movements related to the coefficients of expansion in the system. A constantly acting counter force can be provided if the driving means 22, as is shown schematically in FIG. 3, is placed on a carriage 25 which is freely movable in the end directions of the feed track. For this purpose, a pressurized piston-cylinder 26 is arranged at the end to the right in FIG. 3, this means being stationary and having a piston rod 27 connected to the carriage 25 at the point 28.

The pressure cylinder 26 has the sole task of maintaining the predetermined constant force acting on the tube element pieces 10 and the surface-enlarging members 11, on the feed track 16. The advancing rates for the advancing means 17 and 22 are set individually such that the carriage 25 is within the range of action of the pressurized piston-cylinder unit 26. The advancing rate can be regulated manually or with the aid of known control technology.

Several other alternatives are conceivable for providing the constant force acting on the details placed on the feed track 16.

One example thereof is illustrated in FIG. 4, the same driving means as in FIG. 3 being utilized. Instead of the pressure cylinder 26 and piston 27, a freely dependent weight 29 is used, hanging at one end of a cable denoted by 30, the other end 31 of this cable being attached to the carriage 25. In this example, the cable runs over a rotatable pulley 33 mounted on a stationary shaft 32. With the aid of both these means, advancing through the apparatus can be achieved in a simple way such that a constant force always acts in a direction opposing the advancing direction, and this in turn signifies that a suitable compression of the treated tube element pieces 10 and surface-enlarging members 11 is obtained in spite of movements due to heat in the treated details and advancing movements along the feed track 16.

Instead of sawing off the heat exchanger construction discharged as a cohesive web, it is naturally within the scope of the invention to arrange, or take such steps that groups of definite numbers of tube elements and surface-enlarging members are separated by dummies made from material preventing soldering during advancing to the heating zone.

The apparatus in accordance with the invention can be alternately charged with tube element pieces and surface-enlarging members, in accordance with methods known per se. One method is to arrange a trough 34, as is illustrated to the left in FIG. 3, for automatically advancing elements 10 at predetermined occasions in the direction of the arrow C to the advancing track, and by means of a chute 35 to feed a surface-enlarging member 11 in the direction of the arrow D at determined times, so that the tube element pieces and the surface-enlarging members are alternately placed in the right order at each occasion on said track in accordance with the above and are advanced by the driving means 17 on the feed track.

The invention is not limited to the illustrated and described embodiment example thereof, but can be varied in different ways within the scope of the following patent claims.

I claim:

1. A method of manufacturing heat exchangers comprising tubes with substantially rectangular cross-section alternating with intermediate surface-enlarging means in the form of pleated thin metal strips, which are joined to each other by heating under mutual compression, the starting material used being tube element pieces and surface-enlarging means of predetermined length, the tube element pieces and surface-enlarging means mutually engaging with adjacent long sides in an advancing path, said method comprising: advancing a line of tubes alternating with surface-enlarging means through a heating zone and a cooling zone utilizing a first drive means acting in an advancing direction, uniting said tubes and said surface-enlarging means in said heating and cooling zones, and discharging united tube element pieces and surface-enlarging means from the cooling zone by means of a second drive, which is moved reciprocally as a unit in the path, the second drive means exerting a force on the line of tubes and surface-enlarging means acting opposite to the advancing direction so as to subject the line to a compressive force during advance of the line through the heating zone and the cooling zone, said metal strips having peaks brought into intimate contact with said tubes by heating during passage through the heating zone and by the compressive force.

2. A method as claimed in claim 1, characterised in that the driving movement of the second drive means (22) is regulated automatically in relation to the driving movement of the first drive means (17) in response to the position the second drive means (22) assumes in the advancing path (16).

3. A method as claimed in claim 1 or 2, further comprising inserting spacing means between groups of a predetermined number of tube element pieces and surface-enlarging means to separate the groups from each other, the spacing means not being joined to the groups during passage through the heating zone and the cooling zone.

4. A method as claimed in claim 1 or 2, further comprising mechanically separating groups of a predetermined number of tube element pieces (10) and surface-enlarging means (12,13) from the line after the joining operation.

5. A method of continuous manufacture of heat exchanger members comprising the steps of:

(A) assembling a line having tube elements parallel to each other and alternating with intermediate surface-enlarging means in the form of pleated thin metal strips;

(B) advancing the assembled line through a heating zone and a subsequent cooling zone by means of a drive means;

(C) applying a force component to said assembled line acting in a direction counter to the direction of advance of said assembled line, said force component being applied by bringing an engagement means into engagement with said assembled line downstream of said cooling zone so as to obtain compression of the tube elements and surface-enlarging means comprising said assembled line and to keep the assembled line compressed during a period when the tube elements and surface-enlarging means and being joined by soldering in the heating zone and the cooling zone, said engagement means being movable forwardly and rearwardly along the path of advance of said assembled line of tube elements and surface-enlarging means; and (D) applying to said engagement means a predetermined constant force which provides said force component acting on the advancing tube elements and surface-enlarging means.

6. Method as set forth in claim 5, characterized by operating the engagement means to advance said line of compressed tube elements and surface-enlarging means with a feeding speed slower than the feeding speed of said drive means.

7. Method as set forth in claim 6, characterized by automatically controlling the driving movement of the engagement means in relation to the driving movement of the driven means in response to the position of the engagement means with respect to the advancing path of said assembled line of joined tube elements and surface-enlarging means.

* * * * *